US006407727B1

(12) United States Patent
Plangger

(10) Patent No.: US 6,407,727 B1
(45) Date of Patent: Jun. 18, 2002

(54) DISPLAY DEVICE

(75) Inventor: Guido Plangger, Eschenbach (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/389,827

(22) Filed: Sep. 3, 1999

(30) Foreign Application Priority Data

Sep. 10, 1998 (EP) ............................................ 98203038

(51) Int. Cl.$^{7}$ ............................ G09G 3/36; G09G 3/34; C09K 19/02

(52) U.S. Cl. ............................ 345/87; 345/94; 345/99; 345/204

(58) Field of Search ............................ 345/87, 99, 204, 345/691

(56) References Cited

U.S. PATENT DOCUMENTS 5,206,635 A * 4/1993 Inuzuka et al. ............... 345/99
5,724,060 A * 3/1998 Graham et al. ............... 345/97

FOREIGN PATENT DOCUMENTS

JP 01266595 A * 10/1989 ............ G09G/3/32

* cited by examiner

*Primary Examiner*—Steven Saras
*Assistant Examiner*—William C. Spencer

(57) ABSTRACT

Power consumption in driving ICs for electro-optical devices is reduced by driving all pixels in a frame to one extreme state and then introducing intermediate levels (grey-levels, colours) by multiplexing, using a reduced selection pulse width. In this way the number of level transitions for the extreme states and hence power dissipation is reduced.

18 Claims, 3 Drawing Sheets

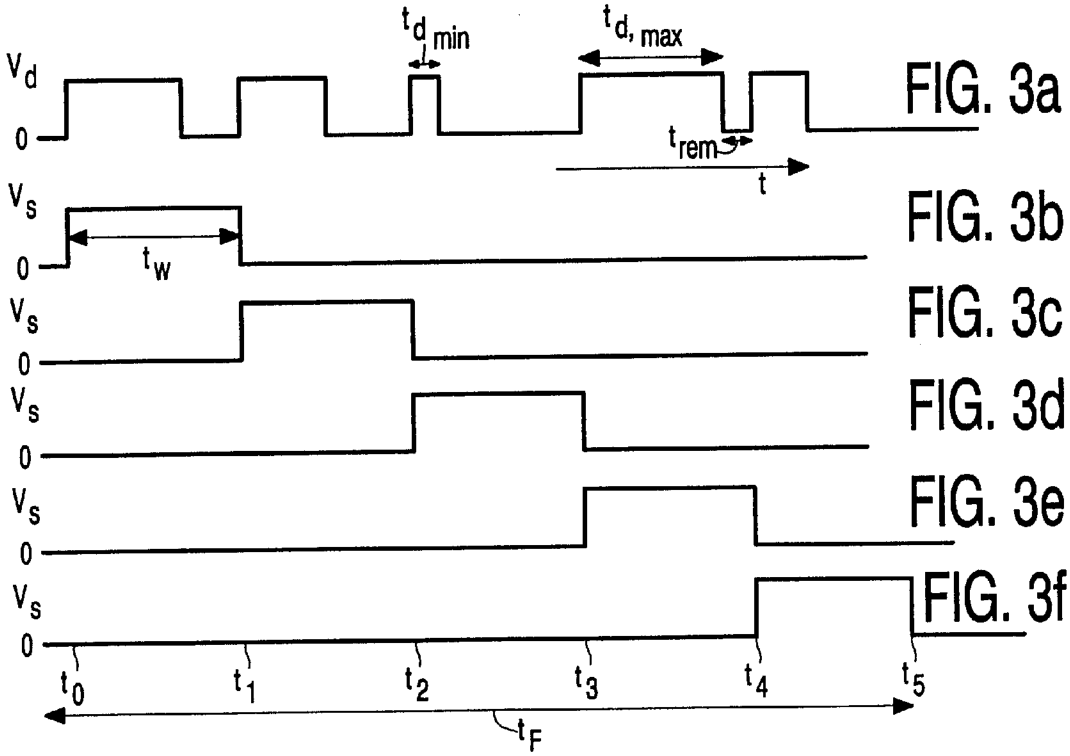
FIG. 3a
FIG. 3b
FIG. 3c
FIG. 3d
FIG. 3e
FIG. 3f
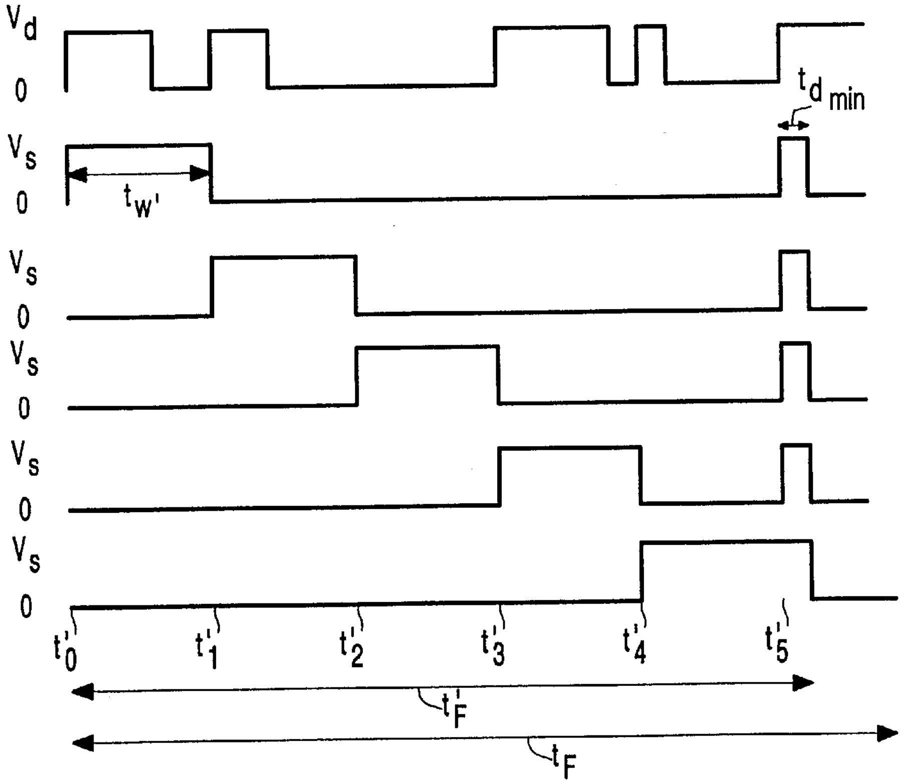
FIG. 4a
FIG. 4b
FIG. 4c
FIG. 4d
FIG. 4e
FIG. 4f

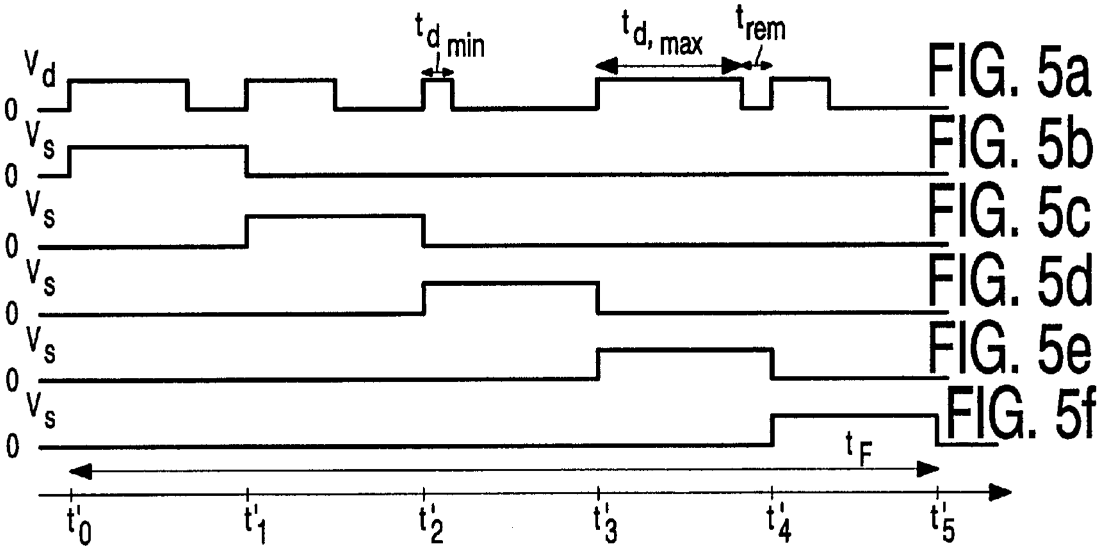
FIG. 5a
FIG. 5b
FIG. 5c
FIG. 5d
FIG. 5e
FIG. 5f
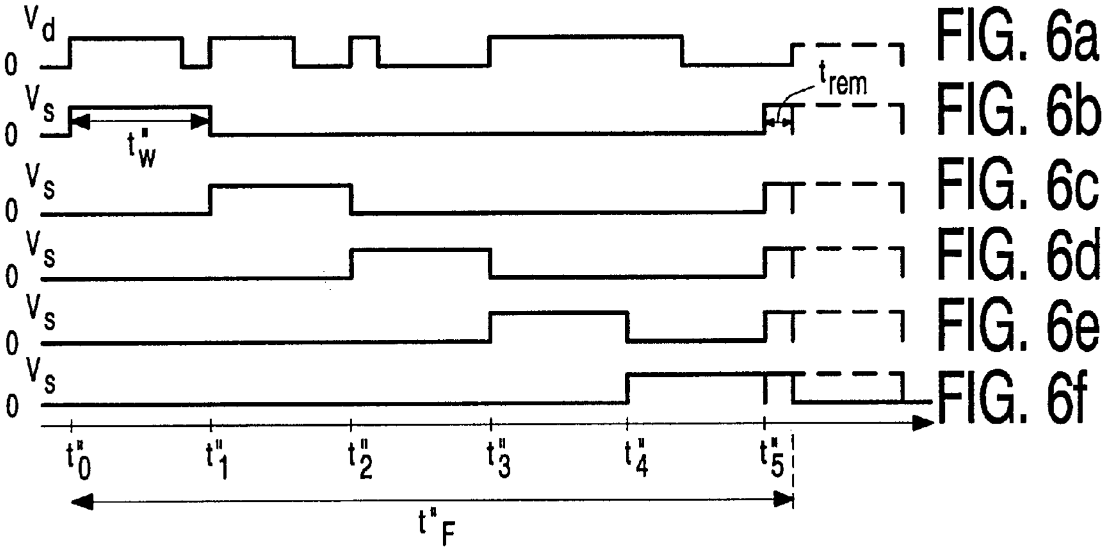
FIG. 6a
FIG. 6b
FIG. 6c
FIG. 6d
FIG. 6e
FIG. 6f
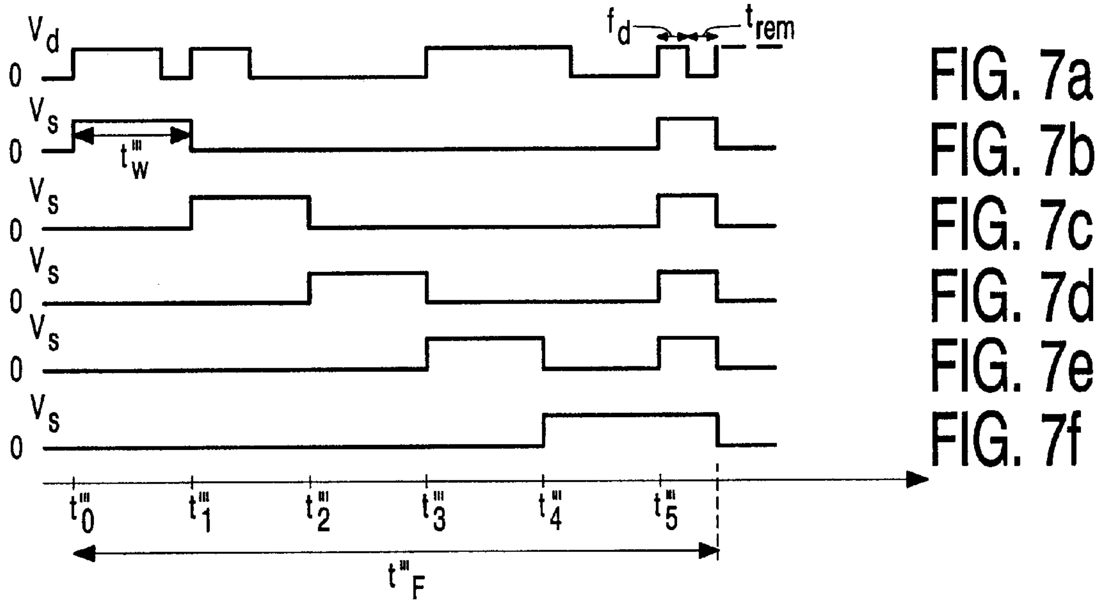
FIG. 7a
FIG. 7b
FIG. 7c
FIG. 7d
FIG. 7e
FIG. 7f

DISPLAY DEVICE

BACKGROUND OF THE INVENTION

The invention relates to a display device comprising an electro-optical display material between a first substrate provided with row electrodes, and a second substrate provided with column electrodes, in which overlapping parts of the row and column electrodes define picture elements, the device further comprising driving means for providing the row electrodes with selection pulses having a selection pulse-width and a selection pulse voltage and for providing the column electrodes with data pulses.

Such display devices are commonly known as passive displays and are used in e.g. mobile phones and portable computers.

A general way of driving these types of displays is known as multiplexing: the RMS-voltage across a picture element, or pixel, determines the light transmission. In passive displays each column electrode as well as each row electrode is common to several pixels. Generally, time-multiplexing is used, in which (subsequent) rows of pixels are selected subsequently during a row selection period, while data-voltages are simultaneously supplied to the column electrodes, dependent on the information to be written. After all rows have been selected (one frame time), this is repeated.

To obtain grey-values (or colours if a birefringent liquid crystal effect is used, such as ECB or STN), pulses of different pulse-width are used for different grey-values (or colours), which implies switching of the data pulse during each selection period at least once, if data is available. For each switching action, the pixel capacitance has to be loaded or reloaded, which is a major source of current (power) consumption in LCD driving circuitry.

BRIEF SUMMARY OF THE INVENTION

It is an object of the present invention to overcome the above mentioned problems at least partly.

A display device according to the invention is therefore characterized in that the device comprises means for diminishing during operation the selection pulse widths within a frame time based on an extreme pulse width of the data pulses to be applied to the column electrodes within a frame time and further driving means for applying, in operation, correction voltages across the picture elements during said frame time.

The invention is based on the recognition that said diminishing of pulse widths renders the above-mentioned switching superfluous for the pulses related to the lightest and/or darkest colour or grey-value within a frame. To guarantee the right colour (grey-value), all pixels are given an extra voltage simultaneously before or after a frame. Because this correction depends on the RMS-value to be corrected, either a voltage correction during the full frame time can be applied, or a pulse width correction can be applied.

A first embodiment is characterized in that the means for diminishing the selection pulse widths comprise means to diminish the selection pulse widths by the minimum pulse width of a data pulse within the frame time. Preferably, the further driving means comprise means for providing row electrodes simultaneously with a pulse having the minimum data pulse width within the frame time during the remainder of the frame time and means for providing the column electrodes simultaneously with a data-pulse. This guarantees optimum contrast.

A further embodiment is characterized in that the means for diminishing the selection pulse widths comprise means to diminish the selection pulse widths by the minimum difference between the selection pulse width and the width of a data pulse within the frame time. Preferably, the further driving means then comprise, for example, means for providing row electrodes simultaneously with a pulse having a pulse width equal to the minimum difference between the maximum pulse width of a selection pulse and the width of a data pulse within the frame time during the remainder of the frame time and means for providing the column electrodes simultaneously with a non-data pulse. This guarantees optimum contrast again.

These and other aspects of the invention will be elucidated with reference to the embodiments described hereinafter.

BRIEF DESCRIPTION OF THE SEVERAL VIEWS OF THE DRAWING

In the drawings:

FIG. 2 is a diagrammatic representation of the display device, while FIGS. 3 to 8 show diagrammatically a plurality of drive pulses The Figures are diagrammatic and not to scale. Corresponding elements are generally denoted by the same reference numerals.

DETAILED DESCRIPTION OF THE INVENTION

Figure 1:
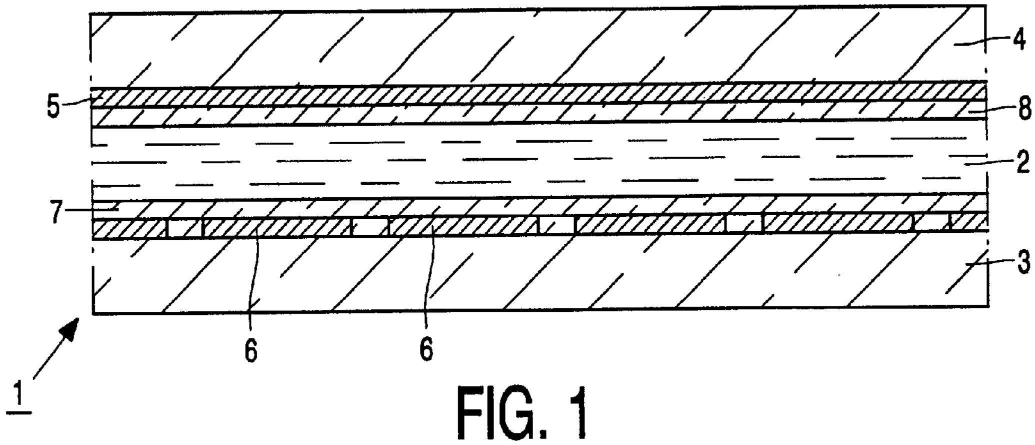
FIG. 1 is a diagrammatic cross-section of a part of the display device, together with a diagrammatic representation of the drive section.
Figure 2:
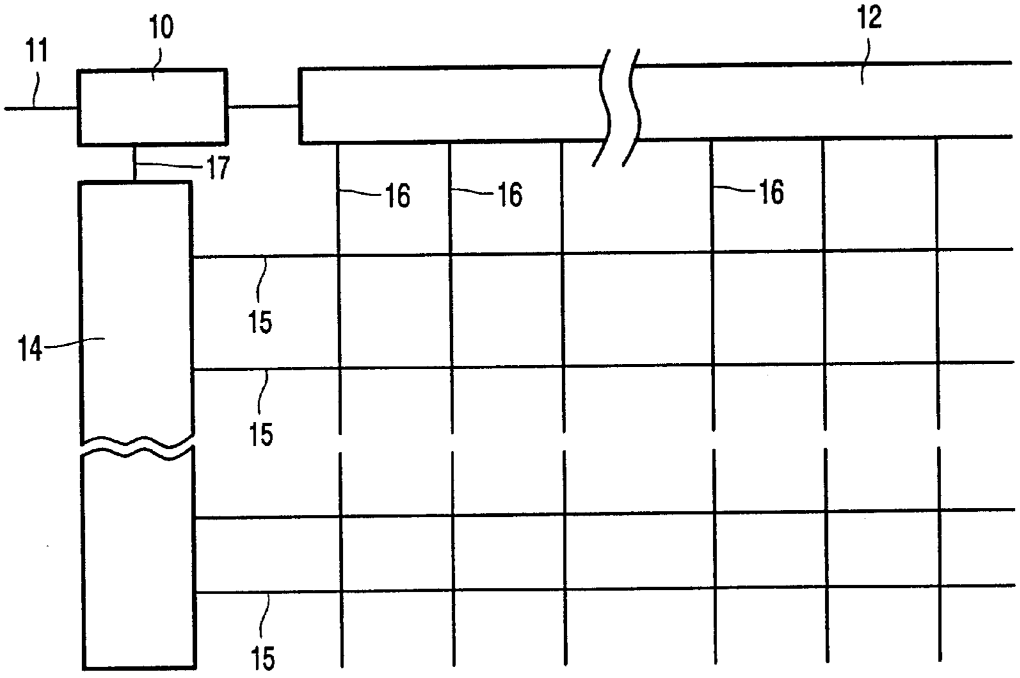

FIG. 1 is a diagrammatic cross-section of a part of a liquid crystal display device comprising a liquid crystal cell 1 with a twisted nematic liquid crystal material 2 which is present between two supporting plates or substrates 3 and 4 of, for example, glass or quartz, provided with selection electrodes 5 and data electrodes 6, respectively, in this embodiment. In this case, the liquid crystal material has a positive optical anisotropy and a positive dielectric anisotropy and a low threshold voltage. If necessary, the device comprises polarizers (not shown) whose polarization directions are, for example, mutually crossed perpendicularly. The device further comprises orientation layers, 7, and 8, which orient the liquid crystal material on the inner walls of the substrates in such a way that the twist angle is, for example, 90°. The picture display device is of the passive type.

Incoming information 11 is processed if necessary, in the drive section 10 and stored in a data register 12 and presented to the data electrodes 6 via data signal lines 16. Pixels, here arranged in rows and columns, are selected by successively selecting row electrodes 5 which are connected to a multiplex circuit 14 via row signal lines 15. The lines 17 ensure the mutual synchronization between the multiplex circuit 14 and the data register 12. After all row electrodes have been selected, this selection is repeated; this is effected at the frame frequency.

FIG. 3 shows data signals (FIG. $3^a$) for one column and row selection signals (FIGS. $3^{b,c,d,e,f}$)for a passive display device using 1:n multiplexing. The rows 1, 2, 3, 4, . . . , n are successively selected by means of row selection pulses having a pulse width $t_w$ and a voltage $V_S$. During non-selection, a non-selection voltage (0V in this example) is applied. The frame time $t_F$ is thus $nt_w$; in a subsequent frame time, the data and row signals are inverted. In this particular example, the display has only five rows so that the frame time is $5t_w$. The brightness of a selected pixel is determined by the voltage on the data electrodes 6 which, in this example, switches between two values, a data voltage $V_d$ and a non-date voltage $V_{nd}$, in this example $V_d$ and 0 V. The pulse width of a data pulse during each selection pulse (width $t_w$) determines the grey-value or colour of the picture element, dependent on the display effect used (pulse width modulation).

As can be seen in FIG. 3[a], the data voltage switches from 0 V to $V_d$ and back during each selection time $t_w$, which is at the expense of much energy in the line driving circuitry. As can be seen in FIG. 3[a] too, the minimum pulse width $t_{d,min}$ of the data voltage pulses occurs in the time period $t_2$–$t_3$, related (in this example) to the darkest grey-value. According to the invention all selection pulses $t_w$ and all data pulses are diminished in width by said amount $t_{d,min}$. This is shown in FIG. 4, where the selection pulses now have a pulse width $t_w'(t_0'-t_1', t_1'-t_2'$, etc.) equal to $t_w-t_{d,min}$. To obtain the right RMS-voltage across a pixel all pixels of the column concerned have to be driven to the ON state (voltage $V_d$ during selection) during the prescribed time within a frame. To this end, all row electrodes get an extra selection pulse having a pulse width $t_{d,min}$ after $t_5'$. In this particular example all rows 1,2, . . . 5 get this extra pulse simultaneously, but this is not absolutely necessary, provided the pulses are applied within the original frame time $t_F$. The resulting frame time can now, however, be chosen as $5t_w'+t_{d,min}$. If necessary, this smaller frame time can be used to drive the display at a higher frequency, thereby reducing flicker. However, the main advantage can be seen in the form of the data voltage (FIG. 4[a]), in which one pulse (the minimum data pulse) has completely disappeared. This will lead to a considerable decrease in switching dissipation in the driving circuitry, especially since these minimum data pulses are generally related to the darkest (or lightest) pixels, which pixels form a background colour or grey-value in most images. In most applications the original frame time, in this example $5t_w$, is maintained ($t_F=5t_w$).

Instead of reducing the selection pulse width by a value $t_{d,min}$, the reduction may also be based on the maximum data pulse width $t_{d,max}$. In this case, all row electrodes receive a selection pulse having a pulse width $t_w''(t_0''-t_1'', t_1''-t_2''$, etc.) equal to $t_{d,max}=t_w-t_{rem}$., see FIG. 5 , which represents the same pulse pattern as FIG. 3. To obtain the right RMS-voltage across a pixel, all pixels of the column concerned have to be driven to the ON state (voltage $V_d$ during selection), but also to the OFF-state, during the right time again. To this end all row electrodes get an extra selection pulse having a pulse width $t_{rem}$ after $t_5''$, while all columns are driven to the OFF-state by applying a non-data voltage (0 V). The resulting frame time may be reduced to $t_F=St_w''+t_{rem}$ (FIGS. 5,6), although in most applications the original frame time $t_F=5t_w$ is maintained again. There are similar advantages as mentioned with respect to the example of FIG. 4. Since the RMS-voltage during a frame determines the light transmission of a pixel, a lower voltage may be applied to the columns, during a longer selection time after $t_5''$, as is shown in FIG. 6 by means of broken lines.

The greatest advantage is obtained if both principles are combined. This is shown in FIG. 7, in which all row electrodes 7,15 receive a selection pulse having a pulse width $t_w'''(t_0'''-t_1''', t_1'''-t_2'''$, etc.) equal to $t_{d,max}-t_{d,min}=t_w-t_{rem}-t_{d,min}$. To obtain the right RMS-voltage across a pixel all pixels of the columns concerned have to be driven to the ON and OFF state again, in this case by means of an extra selection pulse having a pulse width $t_{rem}+t_{d,min}$ after $t_5'''$. The resulting frame time may now be reduced to $tF''=5tw'''-t_{rem}-t_{d,min}$. The actual frame frequency is, however, determined by the actual application again. If the original frame $t_F=5t_w$ is maintained the advantages of less dissipation remain.

Figure 8:
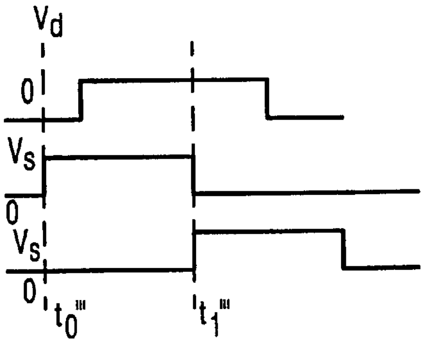

A further reduction of dissipation of the driving circuitry can be obtained by "mirroring". This is shown in FIG. 8 for the for the first two data pulses of FIG. 7. Shifting of the end of the data pulse of the first selection period ($t_0'''-t_1'''$) towards $t_1'''$ cause the data-pulses of two subsequent selections to be combined in one pulse, leading to a reduction of dissipation again, now in the column driver or the column driver part of a display driver.

The shifts $t_{d,min}$, $t_{rem}$, by which the selection pulse width during a frame is reduced is determined, for example, by means of a microprocessor, in which all data voltages for a frame are stored, for example, by storing their width as a number of time-slots. Each original pulse width $t_w$ is divided into a number of time-slots, for example, 64. The duration of a data pulse is measured, for example by comparing with a running counter and the resulting value is stored in the memory of said microprocessor. After storing the values of each frame, the pulse widths to be applied for said frame are determined and submitted to the driving electronics. On the other hand, the shifts $t_{d,min}$, $t_{rem}$ can be derived directly from the minimum and maximum data pulse width by relating the end of the data pulses to values in a counter and using the counter value related to said minimum and maximum pulse width as a means to adopt the pulse widths, for example, by means of multiplexers, shift registers and other logic circuitry.

In summary, the invention provides a way of reducing power consumption in driving ICs for electro-optical devices by driving all pixels in a frame to one extreme state and then introducing intermediate levels (grey-levels, colours) by multiplexing using a reduced selection pulse width. In this way, the number of level transitions for the extreme states and hence power dissipation is reduced.

What is claimed is:

1. A display device comprising:

an electro-optical display material between a first substrate provided with row electrodes and a second substrate provided with column electrodes, in which overlapping parts of the row and column electrodes define picture elements, and driving means for providing the row electrodes with selection pulses having a selection pulse width and a selection pulse voltage and for providing the column electrodes with data pulses, wherein the device further comprises:

means for diminishing in operation the selection pulse widths within a frame time based on an extreme pulse width of the data pulses to be applied to the column electrodes within the frame time, and further driving means for applying, in operation, correction voltages across the picture elements during said frame time.

2. A display device as claimed in claim 1 wherein the means for diminishing the selection pulse widths comprise means to diminish the selection pulse widths by the minimum pulse width of the respective data pulses within the frame time.

3. A display device as claimed in claim 2 wherein the further driving means comprise means for providing the row electrodes simultaneously with a pulse having the minimum data pulse width within the frame time during the remainder of the frame time and means for simultaneously providing the column electrodes with a data pulse.

4. A display device as claimed in claim 3, wherein the display further includes means to diminish each data pulse width by an amount the same as the diminution of the selection pulse widths.

5. A display device as claimed in claim 3, wherein the driving means provide the column electrodes with pulse-width modulated signals.

6. A display device as claimed in claim 3, wherein the frame period is maintained independent of the diminished selection pulse widths.

7. A display device as claimed in claim 2 wherein the device comprises means for causing the respective data pulses for a column for two subsequent selections to be combined in one pulse.

8. A display device as claimed in claim 7, wherein the display further includes means to diminish each data pulse width by an amount the same as the diminution of the selection pulse widths.

9. A display device as claimed in claim 2, wherein the display further includes means to diminish each data pulse width by an amount the same as the diminution of the selection pulse widths.

10. A display device as claimed in claim 1 wherein the means for diminishing the selection pulse widths comprises means to diminish the selection pulse widths by the minimum difference between the selection pulse width and the width of the respective data pulses within the frame time.

11. A display device as claimed in claim 10 wherein the further driving means comprise means for providing the row electrodes simultaneously with a pulse having a pulse width equal to the minimum difference between the maximum pulse width within the frame time during the remainder of the frame time and means for simultaneously providing the column electrodes with a non-data pulse.

12. A display device as claimed in claim 11, wherein the display further includes means to diminish each data pulse width by an amount the same as the diminution of the selection pulse widths.

13. A display device as claimed in claim 11, wherein the driving means provide the column electrodes with pulse-width modulated signals.

14. A display device as claimed in claim 11, wherein the frame period is maintained independent of the diminished selection pulse widths.

15. A display device as claimed in claim 10, wherein the display further includes means to diminish each data pulse width by an amount the same as the diminution of the selection pulse widths.

16. A display device as claimed in claim 1, wherein the display further includes means to diminish each data pulse width by an amount the same as the diminution of the selection pulse widths.

17. A display device as claimed in claim 1, wherein the driving means provide the column electrodes with pulse-width modulated signals.

18. A display device as claimed in claim 1, wherein the frame period is maintained independent of the diminished selection pulse widths.

* * * * *